US008082210B2

(12) United States Patent
Hansen et al.

(10) Patent No.: US 8,082,210 B2
(45) Date of Patent: Dec. 20, 2011

(54) AUTHENTICATION FOR ONLINE MONEY TRANSFERS

(75) Inventors: Scott Hansen, Woodcliff Lake, NJ (US); Kirsten S. Fry-Sanchez, Evergreen, CO (US); Kim C. Hosmer, Castle Rock, CO (US); Ed N. Cortez, Denver, CO (US); Debra Joyner, Littleton, CO (US); Jennifer Wieth, Golden, CO (US); Mark D. Baumgart, Larkspur, CO (US)

(73) Assignee: The Western Union Company, Englewood, CO (US)

( * ) Notice: Subject to any disclaimer, the term of this patent is extended or adjusted under 35 U.S.C. 154(b) by 2106 days.

(21) Appl. No.: 10/832,809

(22) Filed: Apr. 26, 2004

(65) Prior Publication Data

US 2004/0230527 A1 Nov. 18, 2004

Related U.S. Application Data

(60) Provisional application No. 60/466,871, filed on Apr. 29, 2003.

(51) Int. Cl.
*H04M 15/00* (2006.01)
(52) U.S. Cl. ............................. 705/39; 705/40
(58) Field of Classification Search .............. 705/35–45
See application file for complete search history.

(56) References Cited

U.S. PATENT DOCUMENTS

| 5,220,501 | A | 6/1993 | Lawlor et al. |
| 5,326,960 | A | 7/1994 | Tannenbaum |
| 5,350,906 | A | 9/1994 | Brody et al. |
| 5,757,917 | A | 5/1998 | Rose et al. |
| 6,029,150 | A | 2/2000 | Kravitz |
| 6,070,798 | A | 6/2000 | Nethery |

(Continued)

FOREIGN PATENT DOCUMENTS

EP 1 077 436 A2 2/2001

(Continued)

OTHER PUBLICATIONS

Author Unknown "Online Payment Services" www.auctionbytes.com/cab/pages/payment, compiled Nov. 2002, 3 pages.

(Continued)

*Primary Examiner* — Shahid Merchant
*Assistant Examiner* — Stephanie M Ziegle
(74) *Attorney, Agent, or Firm* — Kilpatrick Townsend & Stockton LLP

(57) ABSTRACT

According to the invention, a method for processing a transaction where the transaction is initiated by a payor online, but paid to a payee in-person, is disclosed. In one step, payor information is accepted at a location that located across a wide area network from the payor. Transaction information and payment source information is also accepted at the location. The transaction information includes an amount and a payee identifier and the payment source information includes account details associated with an account of the payor at a money handler. A risk related to a likelihood that the transaction will complete successfully is evaluated. Validating that the payment source information is associated with the payor is manually performed if the risk is excessive. The risk can generally be reduced by the manual validation. The money handler is billed for at least the amount. It is determined if the money handler settles the amount. Historical information on the transaction is stored.

30 Claims, 11 Drawing Sheets

U.S. PATENT DOCUMENTS

| | | | |
|---|---|---|---|
| 6,073,117 | A | 6/2000 | Oyanagi et al. |
| 6,263,446 | B1 | 7/2001 | Kausik et al. |
| 6,263,447 | B1 | 7/2001 | French et al. |
| 6,282,658 | B2 | 8/2001 | French et al. |
| 6,321,339 | B1 | 11/2001 | French et al. |
| 6,351,739 | B1 | 2/2002 | Egendorf |
| 6,367,693 | B1 | 4/2002 | Novogrod |
| 7,356,505 | B2 * | 4/2008 | March .............................. 705/39 |
| 2002/0152160 | A1 * | 10/2002 | Allen-Rouman et al. ...... 705/39 |
| 2003/0182194 | A1 * | 9/2003 | Choey et al. .................... 705/16 |

FOREIGN PATENT DOCUMENTS

| | | | |
|---|---|---|---|
| WO | WO 00/22559 | A1 | 4/2000 |
| WO | WO 00/46725 | A1 | 8/2000 |
| WO | WO 00/79452 | A2 | 12/2000 |

OTHER PUBLICATIONS

Author Unknown "PayPal News", www.andrys.com/paypal.html, published prior to 2003, 3 pages.

Author Unknown "PayPal.com Case Study" http://fox.rollins.edu/~slackman/paypal.htm, 2001, 6 pages.

Boneh, Dan "Beaming Money by Email is Web's Next killer App", PR Newswire, Nov. 16, 1999, pp. 1-4.

Business Editors and High-Tech Writers "billserv.com Launches bills.com, an Internet Portal for Consumers to Pay Bills Online at No Cost" Business Wire, Feb. 22, 2000, pp. 1-2, New York.

Confinity, Inc. "PayPal for the Palm", www.handheldnew.com/file.asp?ObjectID=5401, published prior to Oct. 2003, 2 pages.

Epper Hoffman, Karen "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.

Latour, Almar "PayPal Electronic Plan May be on the Money in Years to Come", The Wall Street Journal Interactive Edition, Nov. 15, 1999, downloaded from www.paypal.com/html/wsj.html, 2 pages.

Plotkin, Hal "Beam Me Up Some Cash" Silicon Valley Insider, Sep. 8, 1999, www.halplotkin.com/cnbcs029.htm, 3 pages.

Steiner, Ina "PayPal Online Payment Service—Another Way to Pay for Auction Items" www.auctionbytes.com, Feb. 20, 2000, 4 pages.

Wijnen, Rene "You've Got Money!", Bank Technology News, Jun. 2000, pp. 1-4, vol. 13, Issue 6, New York.

Mastercard International, *Secure Payment Application* (*SPA*), downloaded from website http://www.mastercardintl.com.

* cited by examiner

AUTHENTICATION FOR ONLINE MONEY TRANSFERS

This application claims the benefit of and is a non-provisional of U.S. Application Ser. No. 60/466,871 filed on Apr. 29, 2003, which is incorporated by reference in its entirety.

BACKGROUND OF THE INVENTION

This invention relates in general to online money transfers and, more specifically, to payment authentication for online money transfers.

An ever-increasing amount of commerce is being done online. Unique ways to send money are being devised to ease the flow of money for online transactions. Inherent to online transactions, the parties never meet in person such that the parties enjoy a certain amount of anonymity. Criminals find comfort in this anonymity which is reflected in the fraud statistics for online transactions.

To capitalize upon online commerce, while reducing the fraud risk, new methods of payment authentication have been devised. There are address verification services that check the address provided against the billing address with the credit card company. Modern credit cards have a CVV2 code imprinted on the back or front of the credit card that is not part of the credit card number. Authenticating that the buyer has the proper CCV2 code tends to show the buyer physically has the card. Similarly, some authenticate the customer service number on the credit card.

Some credit cards have an embedded semiconductor chip that can have various features to reduce the risk of fraud. These new cards are called smart cards. A card reader is necessary at the Internet terminal the purchaser is using to take advantage of the smart card feature. In certain countries, the adoption of smart cards is at insignificant levels.

One type of online transaction subject to the above fraud concerns is the sending of money using online payment to fund the transfer. For example, there are services offered by WesternUnion.com™ that allow using a credit/debit card to make money available for pickup at a retail Western Union™ location. As the money can be paid out almost immediately, authentication of the sender and their card is important to reduce the risk of fraud. Once the money is picked-up, the true owner of the card may dispute the charge leaving little chance of recovery.

BRIEF DESCRIPTION OF THE DRAWINGS

The present invention is described in conjunction with the appended figures.

Figure 1A:
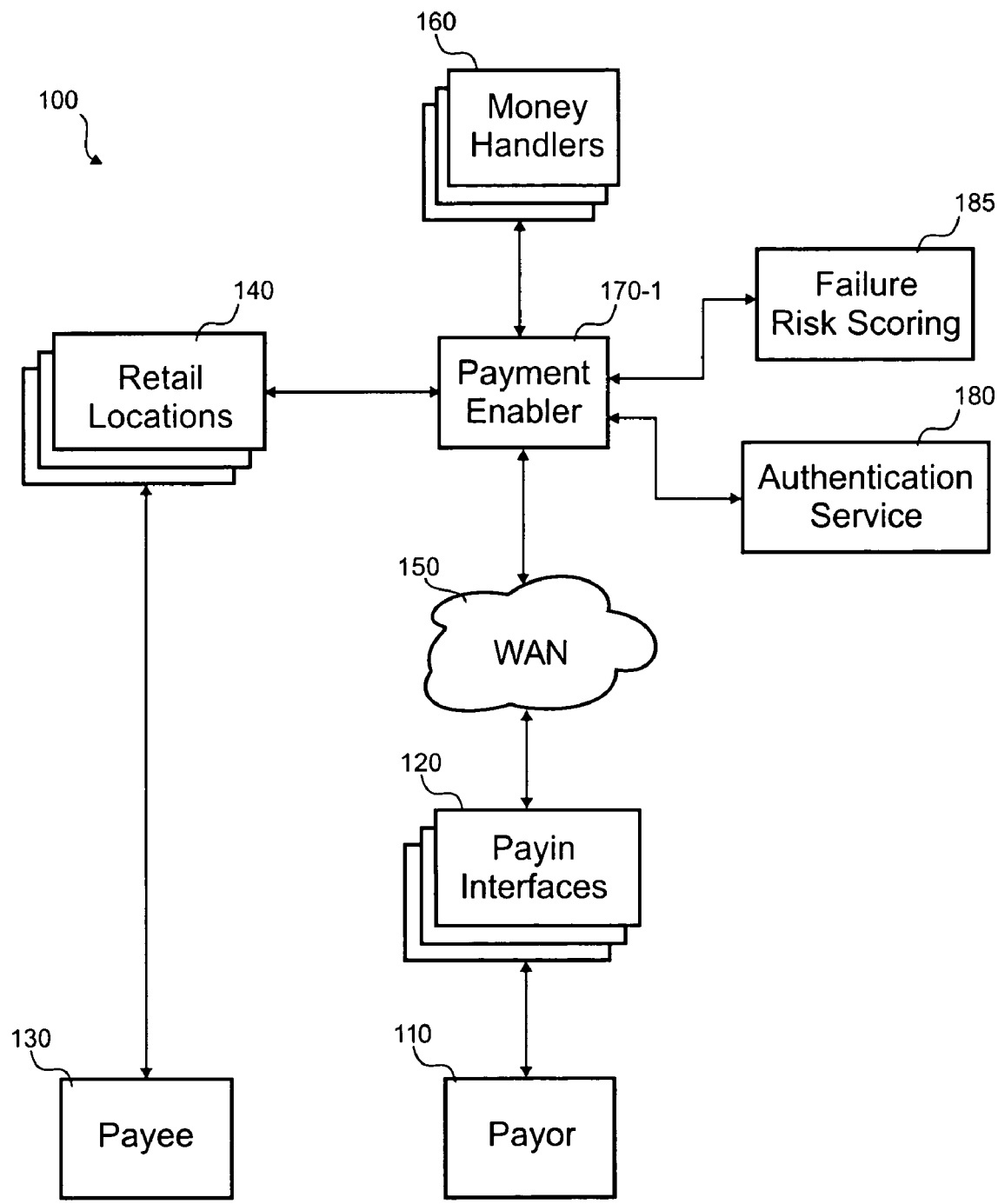
FIG. 1A is a block diagram of an embodiment of a money transfer system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a method for processing a transaction where the transaction is initiated by a payor online, but paid to a payee in-person. In one step, payor information is accepted at a location that is located across a wide area network from the payor. Transaction information and payment source information is also accepted at the location. The transaction information includes an amount and a payee identifier and the payment source information includes account details associated with an account of the payor at a money handler. A risk related to a likelihood that the transaction will complete successfully is evaluated. The transaction information is checked against a usage limit. Validating that the payment source information is associated with the payor is manually performed if the risk is excessive. The risk can be reduced by the manual validation. The money handler is billed for at least the amount. It is determined if the money handler settles the amount. Historical information on the transaction is stored.

In another embodiment, the present invention provides a method for processing a transaction where the transaction is initiated remotely, but paid to a payee in-person. In one step payor information is accepted at a location that is located across a wide area network from the payor. Transaction information and payment source information is also accepted at the location. The transaction information includes an amount and a payee identifier and the payment source information includes account details associated with an account of the payor at a money handler. At least some of the payment source information is verified. A risk related to a likelihood that the transaction will complete successfully is evaluated. A human manually validates that the payment source information is associated with the payor if the risk is excessive. The money handler is billed for at least the amount.

In yet another embodiment, a method for processing a transaction that transfers money or its equivalents from a payor to a payee is disclosed. In various steps, payor information, transaction information and payment source information is accepted from a payor who is located across a wide area network. The transaction information includes an amount and a payee identifier. The payment source information includes account details associated with an account of the payor at a money handler. At least some of the payment source information is verified. A risk related to a likelihood that the transaction will complete successfully is evaluated. The transaction information is checked against a usage limit. It is manually validated that the payment source information is associated with the payor if the risk is excessive or the usage limit is violated. The money handler is billed for at least the amount.

Referring first to FIG. 1A, a block diagram of an embodiment of a money transfer system 100 is shown. In this embodiment, the payor 110 can send money to a payee 130 that is available for pick-up at any of a number of retail locations 140. Depending on authorization, the money is available in a few minutes with automated authorization or a few hours with manual authorization. In this way, the payor 110 can make money available to the payee 130 in 10-15 minutes despite any large geographical separation between the payor 10 and payee 130. Included in the money transfer system 100 are payin interface(s) 120, a wide area network (WAN) 150, a payment enabler 170, a failure risk scoring service (FRSS) 185, an authentication service 180, money handler(s) 160, and one or more retail location(s) 140.

The payor 110 uses one of the payin interfaces 120 to interact with the payment enabler 170 over a WAN 150. The WAN 150 could be a private network or a public network, such as the Internet. In some embodiments, a circuit switched network could be used instead of a packet switched network for the WAN 150. In various embodiments, the payin interface 120 could be a web browser, custom application software, a phone interface, a retail interface, a kiosk interface, or an automated teller machine (ATM) interface as is further explained in relation to FIG. 2 below.

The payment enabler 170 manages operation of the money transfer system 100. Using the payment enabler 170, the payor 110 enters payor information, transaction information and payment source information to set up a transfer to the payee 130. If the payor 10 has an existing account with the payment enabler 170, some previously entered information can be reused for subsequent transactions. The transaction information includes an amount of the transfer and an identifier for the payee 130. The payee identifier can be any group of characters that identifies the payee, such as a name, an e-mail address, a test phrase, an account number, and an identification number. The payment source information provides information for receiving money from an associated money handler 160 and can include an account number and a bank routing number for a bank handler 160; an account holder name, a card issuer phone number, an account billing address, and/or a CVV2 code for a credit/debit card handler 160; or retail store identification information for a retail handler 160. Information to identify the payor 110 is included in the payor information, such as a user ID, a password, a driver's license number, a payor's name, an address, a social security number or portion thereof, a maiden name, a mothers maiden name, an age, a date of birth, and/or other personal information.

To reduce the risk that a transaction will be successfully performed and that the payment transfer will settle, the FRSS 185 and the authentication service 180 are used. The FRSS 185 scores the risk the transaction will result in a charge/debit card chargeback or a bounced electronic check. Some or all of the payor information, transaction information and payment source information is passed to the FRSS 185, which produces a numerical score. Additionally, an IP address used by the payor 110 is passed to the FRSS 185 such that an approximate physical location of the payor's payin interface 120 can be determined and compared against the payor information. The FRSS 185 uses regression analysis against historical information on other transactions and/or information gathered outside the money transfer system 100 to produce the numerical score. The payment enabler processes the score to decide if the transaction should progress further, fail or be verified manually by a human operator. After each transaction or in a periodic batch, information on transactions is passed to the FRSS 185 to update the historical information. Included in the historical information is a failure risk score, an authentication score, a settlement result, the payor information, the transaction information, and the source information. The historical information could also include reason codes from the scoring processes to explain reasons for the scores. This embodiment uses a CCScan™ product available from Shared Global™ for the failure risk scoring service 185. In this embodiment, updating of the historical information allows the failure risk scoring to adaptively score risk. In Table I below, possible reason codes or response codes for one embodiment are shown.

TABLE I

| Reason Code | Code Description |
|---|---|
| 01 | Important Application Data Missing |
| 02 | Deceased Social Security Number (SSN) |
| 03 | SSN Issued Prior to Date of Birth |
| 04 | Possible Stolen Identity Fraud |
| 05 | Possible Move-In Fraud |
| 06 | Invalid or Unissued SSN |
| 07 | Potentially Disconnected Telephone Number |
| 08 | Invalid Telephone Number |
| 09 | Telephone Number is Pager |
| 10 | Telephone Number is Assigned to Mobile Service |
| 11 | Invalid Address |
| 12 | Zip Code Assigned to Post Office Box Only |
| 13 | Address has Suspect Apartment Unit Designation |
| 14 | Higher Risk Commercial or Institutional Address |
| 15 | Higher Risk Commercial or Institutional Telephone Number |
| 16 | Telephone Number Zip Code Mismatch |
| 17 | Full Name and Address Matches on High Risk DM File |
| 18 | Significant Address Matches on High Risk DM File |
| 19 | Unable to Verify Applicant Name, Address, SSN and Telephone Number |
| 20 | Unable to Verify Applicant Name, Address and Telephone Number |
| 21 | Unable to Verify Applicant Name and Telephone Number |
| 22 | Unable to Verify Applicant Name and Address |
| 23 | Unable to Verify Applicant Name and SSN |
| 24 | Unable to Verify Applicant Address and SSN |
| 25 | Unable to Verify Applicant Address |
| 26 | Unable to Verify Applicant SSN |
| 27 | Unable to Verify Applicant Telephone Number |
| 28 | Unable to Verify Applicant Date of Birth |
| 29 | Potential Data Miskey - SSN |
| 30 | Potential Data Miskey - Address |
| 31 | Potential Data Miskey - Telephone Number |
| 32 | Match to Office of Foreign Assets Control (OFAC) |
| 34 | Incomplete Verification |

The authentication service 180 is used to score a risk that the payment source information is not associated with the payor 110 by authenticating the payment source and payor 110. Fraud often occurs where a payor impersonates another after stealing payment information. The authentication service 180 scores this risk using various databases to check the payor information and the source information. In one embodiment, a First Data Solutions™ product called Fast Informer™ or FraudID™ is used. Other embodiments could use Instant ID Plus™ from RiskWise™, ClearCommerce™, and/or Retail Decisions™ products. A risk score is produced by the authentication service 180, which is analyzed by the payment enabler 170 to determine if the transaction should be approved, denied or manually verified.

In this embodiment, the authentication service 180 detects fraud based on confirming the identity of the payor 110 and validating the payor information, transaction information and payment source information against databases. This technique addresses at least the following types of fraud: stolen payment source information, stolen identities, move-in fraud, and created identity fraud. Payor information is validated by checking that the phone numbers and addresses are valid. Also, the payor information, such as the name, address, phone number, social security number, drivers license number, and date of birth, can be checked for consistency against consumer reporting agencies and public record databases. Some embodiments may only collect and check a portion of the social security number. The payor information is checked against high-risk databases, such as phone numbers recently disconnected, consumers that have recently moved from the payor's state, consumers reported as deceased, consumers filing bankruptcy, high-risk addresses (e.g., hotels, campgrounds, correctional facilities, etc.), social security number of a deceased consumer, and social security numbers issued prior to the date of birth. Transaction information and payment source information is scrutinized by checking for first time users of the payment source or the velocity of recent activity with the payment source originating with the money transfer system 100 and elsewhere.

Money handlers 160 serve as the source for money into the transfer system 100. The payor 110 has an existing relationship with the money handler 160 that allows paying for things. Examples of money handlers 160 include retail location handlers, credit/debit card handlers, and bank handlers. Payment source information provided by the payor 110 allows interfacing with the handlers 160 to payin money from an account of the payor 110.

In this embodiment, payment is made to the payee 130 at a retail location. Examples of retail locations include Western Union™ locations, check cashing store fronts, payday loan stores, currency exchanges, bill payment stores, banks, etc. These retail locations 140 are arranged in an affiliate network such that the payor may specify any location 140 for making the money available. In some embodiments, the payee 130 does not have a specified retail location 140, but can receive the money at any retail location 140. The retail location 140 verifies the payee is properly associated with the identifier specified by the payor 110. In some cases, this may involve asking for a test phrase or password from the payee or checking identification in the conventional manner. Some embodiments may use biometric information to further verify the identity of the payee 130.

Figure 1B:
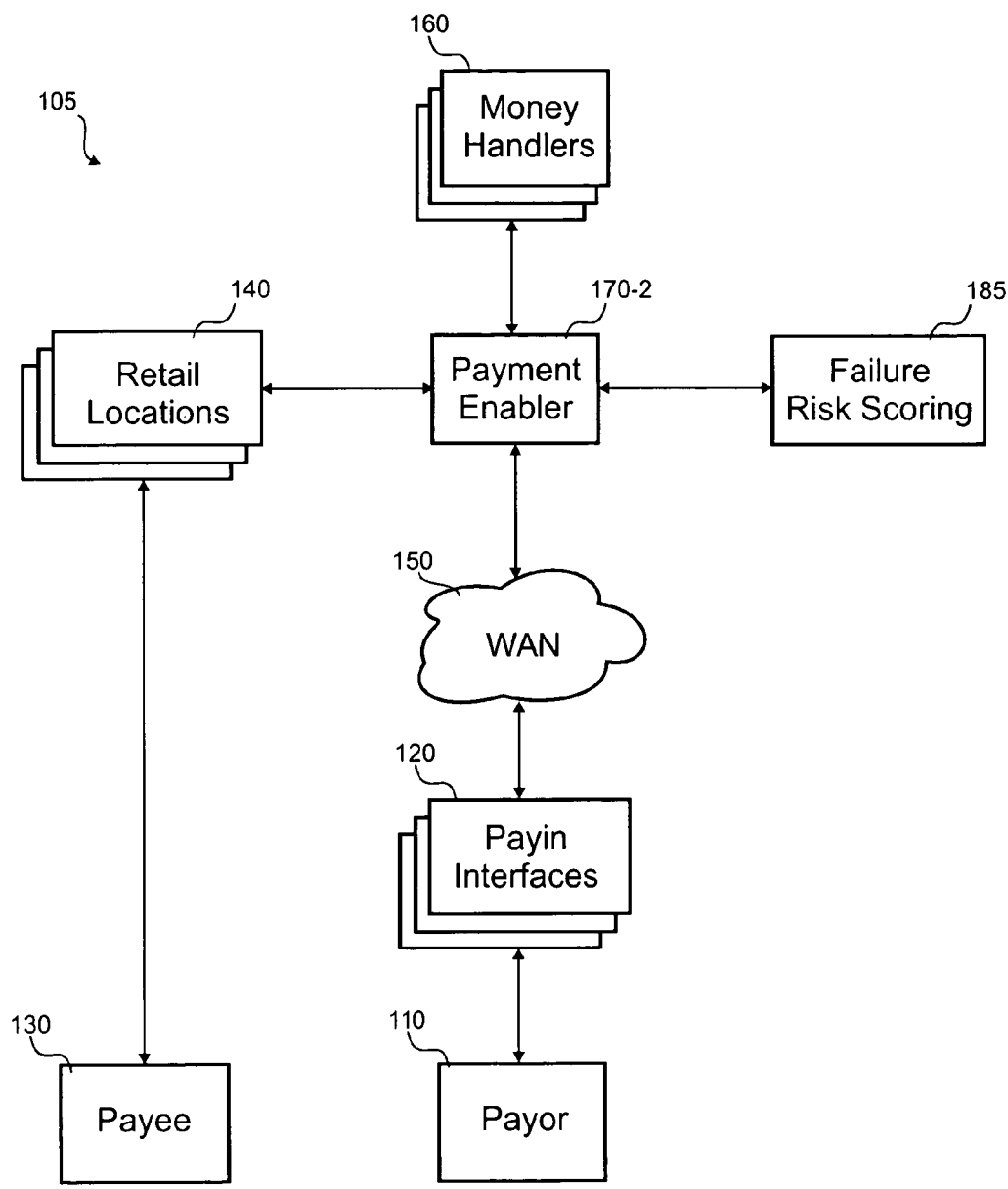
FIG. 1B is a block diagram of another embodiment of a money transfer system.

With reference to FIG. 1B, a block diagram of another embodiment of a money transfer system 105 is shown. This embodiment includes a FRSS 185, but not a separate authentication service 180. Authentication of the user in this embodiment is performed by evaluating the risk of chargeback.

In this embodiment, there are generally three tests performed by the FRSS 185. The first test relates to identification of the location of the payor. Location information may be gathered differently for the different payin interfaces 120, more specifically, the phone interface 120-5 gathers caller ID information; the retail, kiosk and ATM interfaces 120-4, 120-2, 120-1 provide their known location; and the Internet interface 120-3 can gather IP addresses and clock settings for the terminal the payor 110 is using. By knowing the IP address and clock settings for the payor's computer, the approximate location and time zone can be presumed. Where the current location of the payor discerned through this process does not match the billing location associated with the handler 160 within some margin of error, a "Exceeds Card Profile" response code is generated.

A second test can result in generation of other response codes. This second test compares information provided by the payor 110 against historical information from previous transactions. Multiple criteria are used to analyze the provided information. Additional response codes are possible from this analysis. Table II lists the six possible response codes for this embodiment.

TABLE II

| Response Code | Code Description |
|---|---|
| 210 | Negative Account Record |
| 215 | Negative Location History |
| 220 | Account With Chargeback History |
| 225 | Location With Chargeback History |
| 230 | Exceeds Card Profile |
| 250 | Transaction Exceeds Location Profile |

The third test performed by the FRSS 185 involves scoring the information provided by the payor 110 against historical norms. Every new transaction is entered into the FRSS 185 to update the historical database. As chargebacks, non-sufficient funds notices, or other unfavorable settlements are determined that information is used to update the prior recorded transaction information. A numerical score between 0-999 is produced for each presented transaction. One or more score thresholds could be used to trigger such things as declining to fund the transaction online or requiring manual human validation of the transaction. In one embodiment, a score below 336 requires manual validation before the transaction is funded. Although this embodiment has the FRSS 185 performing a different process for assessing the risk of chargeback than that of FIG. 1A, various embodiments could mix and match test elements from the above embodiments.

Figure 2:
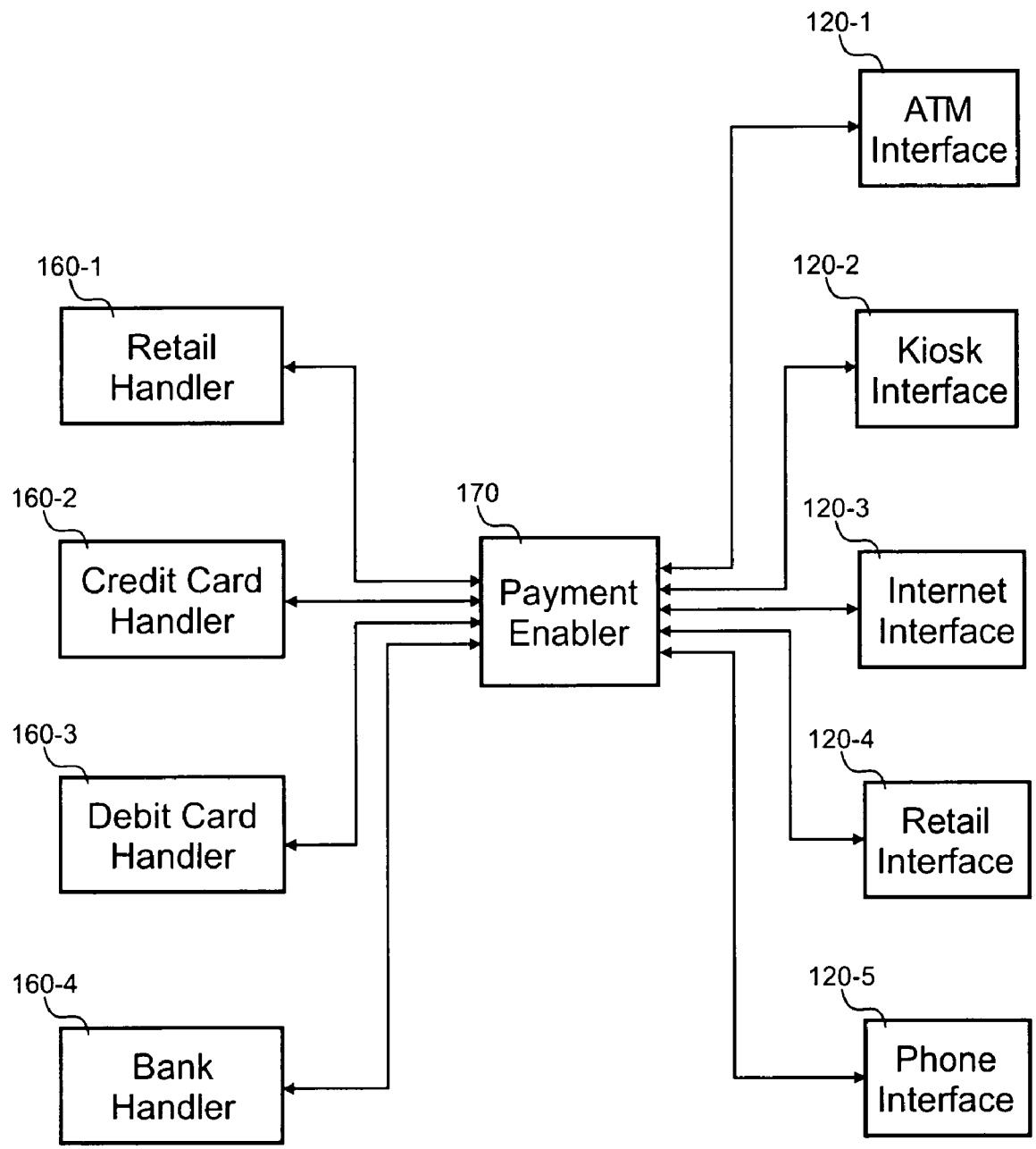
FIG. 2 is a block diagram of an embodiment of portions of the money transfer system.

With reference to FIG. 2, a block diagram of an embodiment of portions of the money transfer system 100 is shown. This embodiment includes five different payin interfaces 120 and four different money handlers 160 that are connected to the payin enabler 170. Other embodiments could include a subset of the payin interfaces 120 and money handlers 160 or could include others not shown in this embodiment. This figure shows the payin interfaces 120 directly connected to the payment enabler 170, but this connection could be a virtual connection through the WAN or Internet 150.

The payor 110 is given a variety of ways to interact with the payment enabler to configure a transaction. Additionally, the payee 130 could interact with the payin interfaces to facilitate payout in some embodiments. The five types of payin interfaces 120 shown include an ATM interface 120-1, a kiosk interface 120-2, an Internet interface 120-3, a retail interface 120-4, and a phone interface 120-5. Information such as the payor information, transaction information and payment source information is entered using the payin interface 120 to configure a transfer. Typically, the payin interface 120 is remote to the payment enabler 170, but is available to the payor 110. The payor 110 can interchangeably choose any payin interface 120 that is convenient to configure a transfer.

When the payor 110 configures the first transaction, the entered information can be retained and associated with an account for the payor 110. For subsequent transactions, only a user name, password, and transaction information need be entered if the previously entered information is still applicable for the current transaction. The payor 110 is given opportunity to change the payor information and payment source information that may have changed since the last transaction or may otherwise warrant changes.

The ATM interface 120-1 may be an application that runs on various ATMs located around the world. ATM cards and credit/debit cards could be machine read by the ATM to configure the interface to the associated money handler. Other information could be entered with a keypad. In some embodiments, the ATM may have a web browser interface application that connects to the payment enabler 170 to configure a transaction. Similar to an ATM with a browser interface, a kiosk interface 120-2 could be used to enter information into the payment enabler 170 in a similar manner.

The Internet interface 120-3 is a web browser interface that reads pages from the payment enabler 170. This interface 120-3 is accessible by the payor 110 from any personal computer that has a web browser connected to the WAN or Internet 150. In some cases, customized application software could be loaded onto a computer accessible to the payor 110 to allow interface with the payment enabler 170.

One option the payor 110 has is to visit a retail location to payin the funds for a transaction. The retail location could have a kiosk 120-2 available for entering the information or a clerk could solicit the necessary information for entry into the retail interface 120-4. There is also the option where the retailer has a phone with a connection to the a customer service representative who interacts with the payor 110 to stage a transaction. In this case, the clerk accepts a PIN number given to the payor over the phone from the customer service representative and collects the payment. Where the clerk is used, the clerk acts as the agent of the payor 110. This embodiment allows a payor 110 to fund a transaction without computer knowledge.

Another embodiment allows use of the phone interface 120-5 for a payor who wishes to avoid computers and retail locations. An operator takes in the necessary information over the phone while interacting with the payment enabler 170. Despite the direct interaction being performed by an operator or a clerk, an account for the payor 110 is configured in this embodiment. The account retains some information on the payor 110 and eases identification of the payor 110, which can aid in reducing fraud.

This embodiment can draw money from four different money handlers 160, namely, a retail handler 160-1, a credit card handler 160-2, a debit card handler 160-3, and a bank handler 160-4. Other embodiments could use some or all of these handlers or could allow for other types of handlers. In general, a money handler 160 is any non-cash payment source configured to benefit the payor 110 for an electronic payment. Account numbers and other payor information and payment source information is used to interface with the money handlers 160 in an automated way. Although the connections between the money handlers 160 are shown as direct connections, those skilled in the art appreciate that various networks are available to virtualize some of those connections.

The retail handler 160-1 is used in conjunction with the retail interface 120-4 discussed above. The payor 110 provides payor information, transaction information and payment source information to the agent, where the payment source information is merely giving cash or other payment to the agent on behalf of the retail hander 160-1. After entry of the information and sufficient verification, the agent informs the payment enabler 170 that the money is available for transfer. In one embodiment, the payor 110 may stage the transaction on the phone and provide a code to the agent indicative of the staging such that the transaction can be funded at the retail location.

The credit and debit card handlers 160-2, 160-3 provide access to the payor's charge account or bank account. These systems interface with the credit/debit card companies that are supported by the handler. Information such as the payor information and payment source information is used to configure the debit/credit card handlers 160 for transferring money. The credit/debit card handler 160 is provided with at least the card holder name, the card number, and the expiration date to allow authorizing the transfer. Once configured, the transaction information is used to initiate a transfer. The credit/debit card handler 160-2, 160-3 communicates to the payment enabler 170 when the transfer doesn't clear because of non-sufficient funds in a bank account or because of the payor 110 disputes the bill, for example.

The bank handler 160-4 allows electronic money transfers from bank accounts associated with all the payors 110 of the system 100. The bank handler 160-4 interfaces to the ACH network to transfer money from bank accounts in this embodiment. In the payment source information is an account number and routing information that is used to perform the transfer. Clearing information is provided to the payment enabler 170 as the bank handler 160-4 determines it.

Although the above embodiment describes money handlers 160 receiving funds for a transaction, other arrangements are possible. A first money handler 160 may be specified as a primary source of funds, but a second money handler 160 is specified as a source of funds if the transfer from the first money handler 160 fails for any reason. In some cases, the payor 110 may use a number of money handlers 160 to fund a single transaction by dividing the transfer amount in a specific way among the money handlers 160.

Figure 3A:
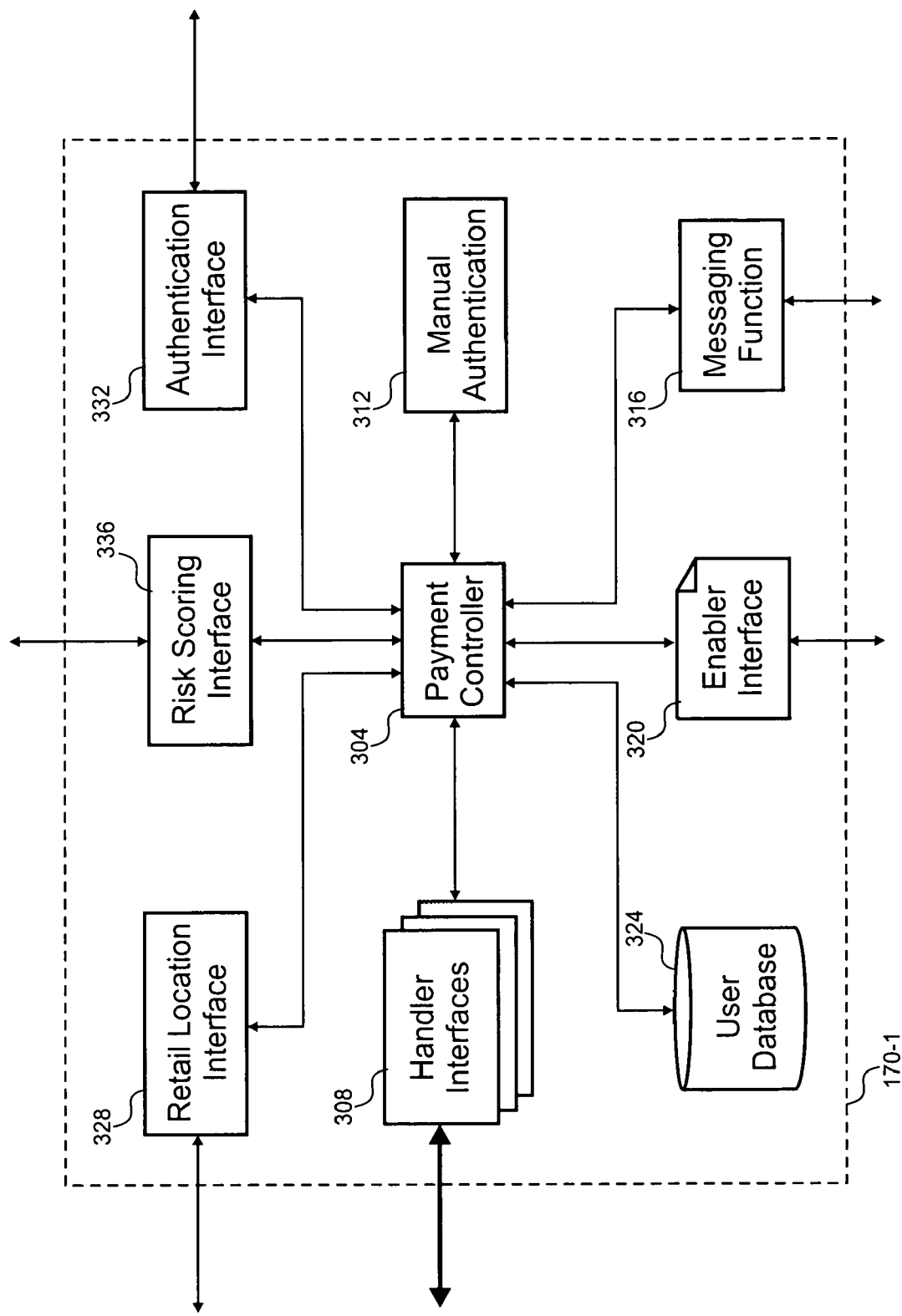
FIG. 3A is a block diagram of an embodiment of a payment enabler.

Referring next to FIG. 3A, a block diagram of an embodiment of a payment enabler 170 is shown. The payment enabler 170 manages operation of the money transfer system 100. Included in the payment enabler 170 are a payment controller 304, handler interfaces 308, a manual authentication function 312, a messaging function 316, an enabler interface 320, a user database 324, a retail location interface 328, an authentication interface 332, and a risk scoring interface 336. One or more computer systems interconnected by various networks could implement the functionality of the payment enabler 170 as is well known in the art.

The payor 110 enters information through the enabler interface 320 and the payment controller 304 relays the information to the user database. When managing a money transfer, the payment controller 304 accesses the user database 324 to provide the information to the money handlers 160 by way of handler interfaces 308. The payment controller determines how the risk scoring interface 336, the authentication interface 332 and the manual authentication function 312 should be used to reduce fraud. When payment is made, the payment controller 304 sends authorization to pay by way of the retail location interface 328.

In this embodiment, communication by the payment enable 170 with people is performed by the enabler interface 320 and messaging function 316. The enabler interface 320 is a set of web pages that collectively form a web site. These pages have forms and status information for the payor 110 or their agent. The payor 110 can log on with these pages to enter payor information, transaction information and payment source information as well as see transaction history information. Status information can be provided by the messaging function 316 using e-mail, short messaging services (SMS), pager networks, mobile phone WAP interfaces, an instant message, or other electronic communication methods. Completion of a transaction status, clearing status, payment pickup by the payee 130, periodic transaction histories and other information can be provided to the payor 110. Additionally, the payee 130 could be sent information from the messaging function 316 such as the availability of funds for pick-up, for example.

Information about the payors 110 and payees 130 for the money transfer system 100 are stored in the user database(s) 324. This information includes transaction histories, payor information, transaction information, payment source information, and login information. The transaction histories for past money transfers include the handler chosen, the amount, the payee, and clearing information.

The handler interfaces 308 interface with the various money handlers 160 supported by the money transfer system 100. Each money handler 160 may require information in different formats and/or using various communication methods. The handler interfaces 308 allow this communication by translating formats and supporting the various communication methods. For example, the retail handler 160 may communicate to a clearinghouse for retail locations using a circuit switched line using a particular format unique to that retail handler 160-1. As new money handlers 160 are supported by the payment enabler 170, corresponding handler interfaces 308 are added.

The risk scoring interface 336, the authentication interface 332 and the manual authentication function 312 are used to reduce fraud in transactions. The risk scoring interface 336 communicates with a FRSS 185. Information is provided by the risk scoring interface 336 to the FRSS 185 which produces a score that is analyzed by the payment controller 304. Similarly, the authentication interface 332 communicates information to an authentication service 180 to produce another score that is analyzed by the payment controller 304. The FRSS 185 and the authentication service 180 produce results quickly and automatically, whereby human action is not used during these processes.

When the payment controller 304 deems it is warranted, some transactions are further scrutinized with a manual authentication function 312. A specialized call center performs the manual authentication function 312. The call center may telephone the payor 110 or the payor 110 may initiate the telephone call. In one embodiment, the payor 110 is notified that manual authentication is necessary by the enabler interface 320 at the time of transaction entry. In some cases, the messaging function may reiterate the need for manual authentication or communicate that need for the first time if manual authentication is deemed necessary after the payor 110 completes entry of the transfer.

The call center operators performing the manual authentication function 312 interact with the payor 110 (either by phone, another payin interface 120, or live chat) to further reduce the risk of a fraudulent transaction. Quantitative information is retrieved from commercial databases, such as Lexis/Nexis™ in one embodiment, that includes information not previously provided by the payor 110 which would be unlikely to be known by someone impersonating the payor 110. This information could include age, sex, prior addresses, mothers maiden name, social security number, employer, loans, and/or other information. Further, the operator judges credibility in less qualitative ways such as believability, voice tone matching the age and sex of the payor, ease at which the questions are answered, etc. The conversation between the operator an payor 110 may be recorded for later analysis. After the operator concludes their interview with the payor 110, the results are recorded with the payment controller.

Presuming the fraud risk is acceptably within norms for the payment controller 304, the transferred amount is made available at a specified retail location 140. Interfacing with the system of retail locations is performed by the retail location interface 328. Some embodiments may have different retail location interfaces to allow interfacing with different systems of retail locations. In this embodiment, the payor 110 specifies the particular retail location 140 that the payee 130 will receive the transfer amount from. Other embodiments could make the transfer amount generally available to some or all retail locations 140 such that the payee 130 can pick from a number of retail locations 140.

Figure 3B:
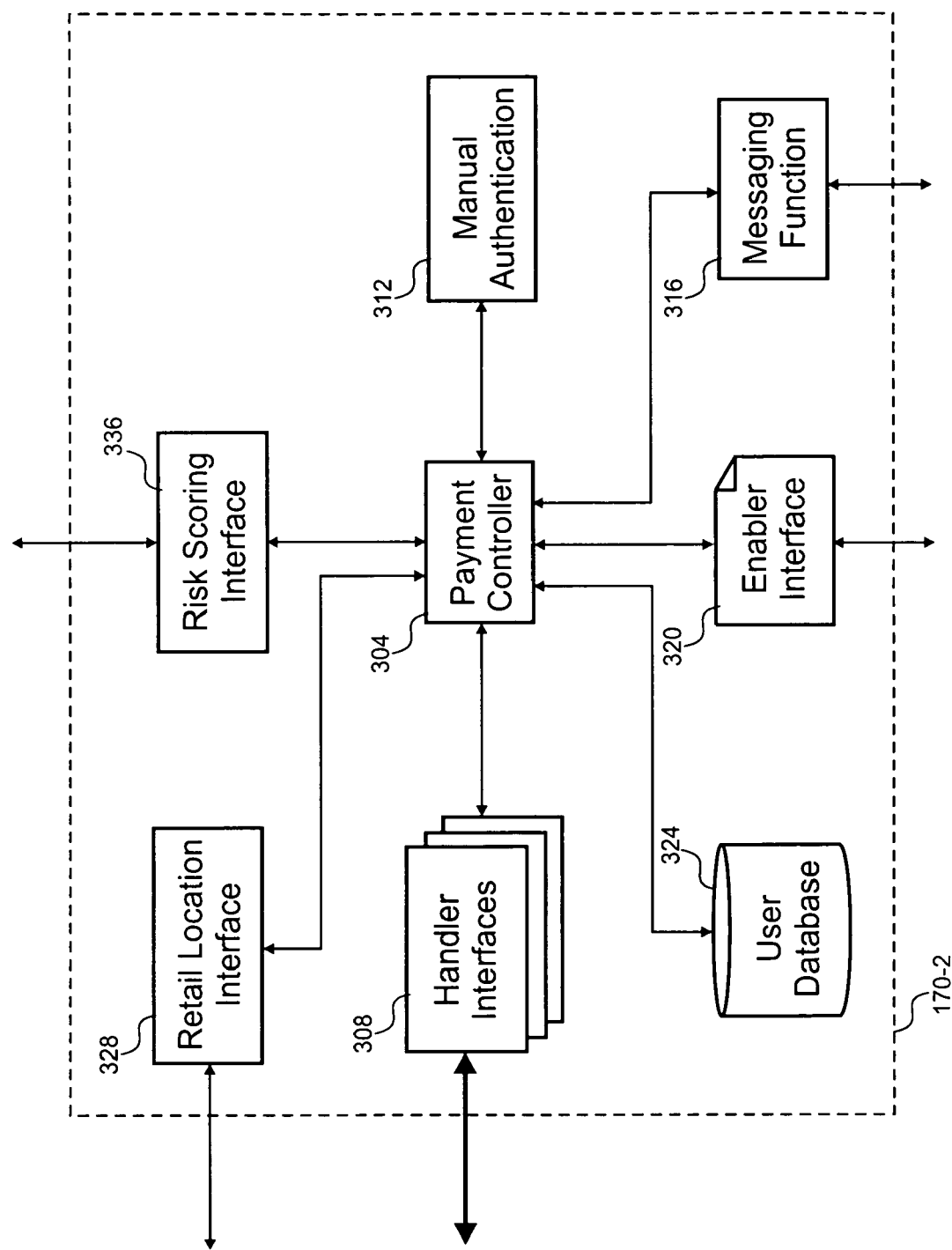
FIG. 3B is a block diagram of another embodiment of a payment enabler.

With reference to FIG. 3B, a block diagram of another embodiment of a payment enabler 170-2 is shown. This embodiment does not include the authentication interface 332 as it relies upon the FRSS 185 for authentication of the payor 110. This embodiment of the payment enabler 170-2 is used with the embodiment of FIG. 1B.

Figure 4:
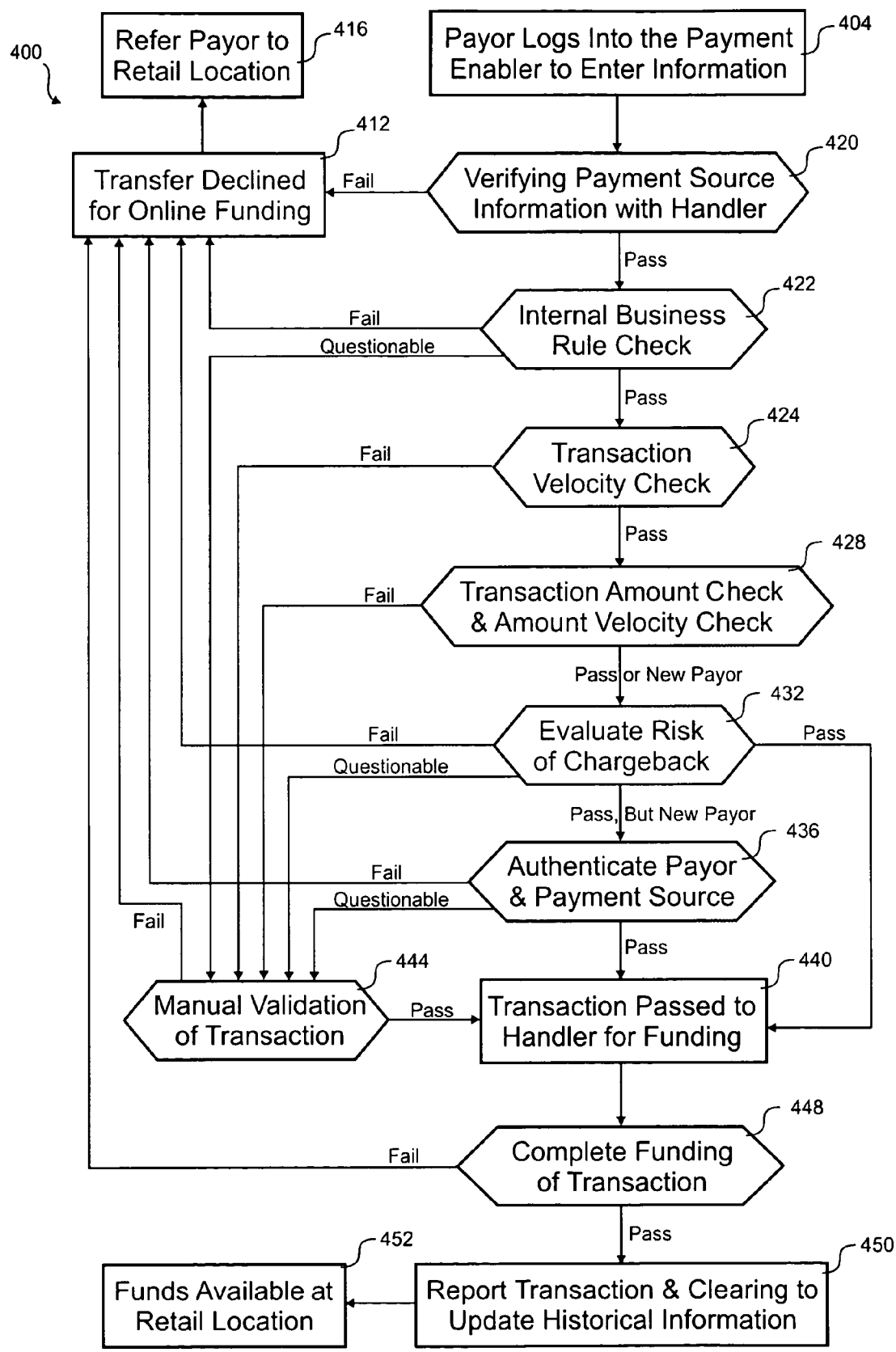
FIG. 4 is a flow diagram of an embodiment of a process for performing a money transfer.

With reference to FIG. 4, a flow diagram of an embodiment of a process for processing a money transfer 400 is shown. This embodiment allows automatically determining some transactions have an acceptable fraud risk, while referring some transactions to the manual authentication function 312 where the fraud risk cannot be automatically determined to have an acceptable risk. Where the fraud risk is still unacceptable, payors 110 are referred to a retail location 140 for processing. The retail location has further techniques to reduce the fraud risk.

The depicted portion of the process 400 begins in step 404 where the payor 110 logs into the payment enabler 170 using a payin interface 120. Where the payor 110 is new to the money transfer system 100, an account is configured with the payor information and the payment source information. Once the account is configured, transaction information is also entered. All this information is stored in the user database(s) 324 along with information on prior transactions such as amounts, scoring, reason codes for that scoring, manual validation results, recordings of manual validations.

In step 420, the payment source selected for the transaction is verified. Where a credit/debit card is being used, a test authorization for a nominal amount is performed. In this embodiment, the payment enabler 170 presents a one dollar charge to the credit/debit card handler 160-2, 160-3 to see if the payment source information is valid. For checking accounts, the payor's bank or a database of bank account information is queried to determine if the bank account exists. In some cases, an account balance adequate for the transaction may be verified. Where the payment source information cannot be verified, the transfer is declined for online funding in step 412 and the payor 110 is presented with a message referring him or her to a retail location 140 to fund the transaction. Based upon the payor information, retail locations that are presumed convenient may be suggested.

Where the payment source information is verified in step 420, processing continues to step 422 where internal business rules of the money transfer system 100 are applied to the transaction. In various embodiments, these business rules may or may not be active. The below Table III shows business rules applied to a credit/debit card transaction and their active/inactive state for this embodiment. Some of the same rules along with others unique to bank account transfers could be used for bank transfers.

TABLE III

| Internal Business Rule | Status |
|---|---|
| Check that data required has been entered | Active |
| Check that basic arithmetic functions on the card number can be performed correctly | Active |

TABLE III-continued

| Internal Business Rule | Status |
| --- | --- |
| Check that credit card formats are correctly entered | Active |
| Check first 6 digits of card against list of valid bank identification nos. where foreign issued cards are manually validated | Active |
| Check payee name against internal database | Inactive |
| Check payor phone number against internal database | Inactive |
| Check card number against internal database | Active |
| Check payor's account against internal database | Active |
| Check if card is also associated with another user | Active |
| Check if the payor and payee have the same name and are likely the same person which should be treated as a cash advance unless a debit card is specified | Active |
| Check if the phone number is of an illegal format, for example, uses an illegal area code | Active |
| Check if the sender name does not match a name previously entered for the account | Active |
| Check if the payor already has an account by matching name records, e-mail addresses, customer ID, etc. | Active |

If the internal business rules are performed successfully, processing continues to step 424 where a velocity check is performed on the number of transactions for a given time period. Various embodiments could trigger manual validation in step 444 where there are more than three transactions in thirty days, more than three transactions that have gone to manual validation in thirty days, etc.

Where the transaction velocity is not triggered in step 424, processing continues to step 428 where a transaction amount check and an amount velocity check are performed. In this embodiment, manual validation by the manual authentication function 312 is performed if the transaction amount is one thousand dollars or more. Where this payor 110 has sent more than two thousand dollars in the last thirty days, the amount velocity check is triggered and requires manual validation of the transaction in step 444. If over $2,000, the payor is referred to retail location.

If the tests in step 428 fail or if the payor 110 has not successfully completed a transaction before, processing continues to step 432 where the risk of a chargeback is assessed by the FRSS 185. Some embodiments only send some the transactions to the FRSS, while others send all transactions to gather more data on the failures. A score is provided by the FRSS 185 along with response codes. The payor 110 is referred to a retail location 140 for scores below a first threshold regardless of reason codes and history. The payor 110 is passed to step 440 for scores above a second threshold (providing they have a favorable history and no negative response code), if not they go to 444 for manual validation, and the payor 110 is passed to manual validation in step 444 for scores between the first and second thresholds.

In step 436, the authentication service 180 is used to authenticate the payor and payment source to evaluate a risk that the payment source information is not associated with the payor 110. In other words, the risk that payor 110 is impersonating the true account holder. A score is provided by the authentication service that is analyzed by the payment enabler 170. A transaction below a first threshold referred to the retail locations 140 for funding, above a second threshold is passed to step 440 for funding, and between the first and second thresholds is manually validated in step 444.

Manual validation by an operator in a call center is performed in step 444 for those situations described above. In this embodiment, the payee calls to the call center using a number provided on a web page displayed after automatic authorization of the transaction has failed. If the manual verification fails, the payor 110 is referred to a retail location 140.

Alternatively, the processing continues to step 440 for funding if the manual verification is successful. The results of the manual validation is either communicated directly to the payor 110 during the phone call or in a message sent to the payor 110 with the messaging function 316. Some embodiments can check the number used by the payor 110 to call into the system with against the phone number given in the payor information 110.

Those transactions that are authenticated by whatever means, proceed to step 440 where the money handler 160 is used to fund the transfer. If the transfer is rejected by the money handler 160, the payor 110 is notified with a message referring them to a retail location 140 for funding. Where the funding is initially accepted, processing continues to step 450 where the historical information for this transaction is stored in the user database 324 and is reported out to the FRSS 185. As clearing information is received for bank account transactions and credit card transactions, updates are stored in the user database 324 and reported out to the FRSS 185. In step 452, the funds are made available to the payee 130 at the retail location 140. For automated authentication, this process takes around 10-15 seconds and the entire transaction from beginning to end takes about 10 to 15 minutes based on speed of Internet access. Where manual validation is required, the delay is largely dependent upon how quickly the payor 110 calls into the system 100.

Figure 5A:
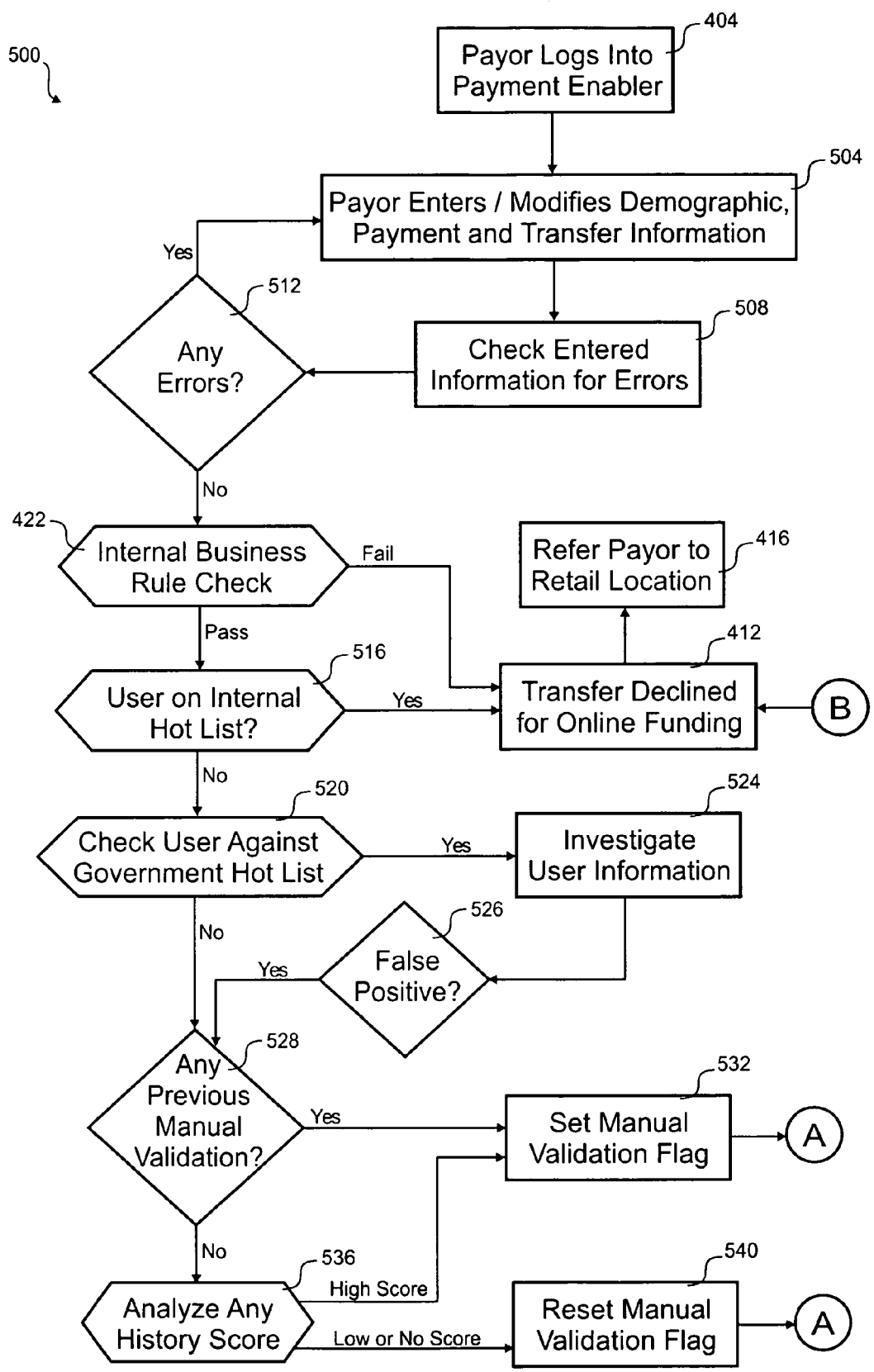
FIGS. 5A and 5B are block diagrams of another embodiment of a process for performing a money transfer.
Figure 5B:
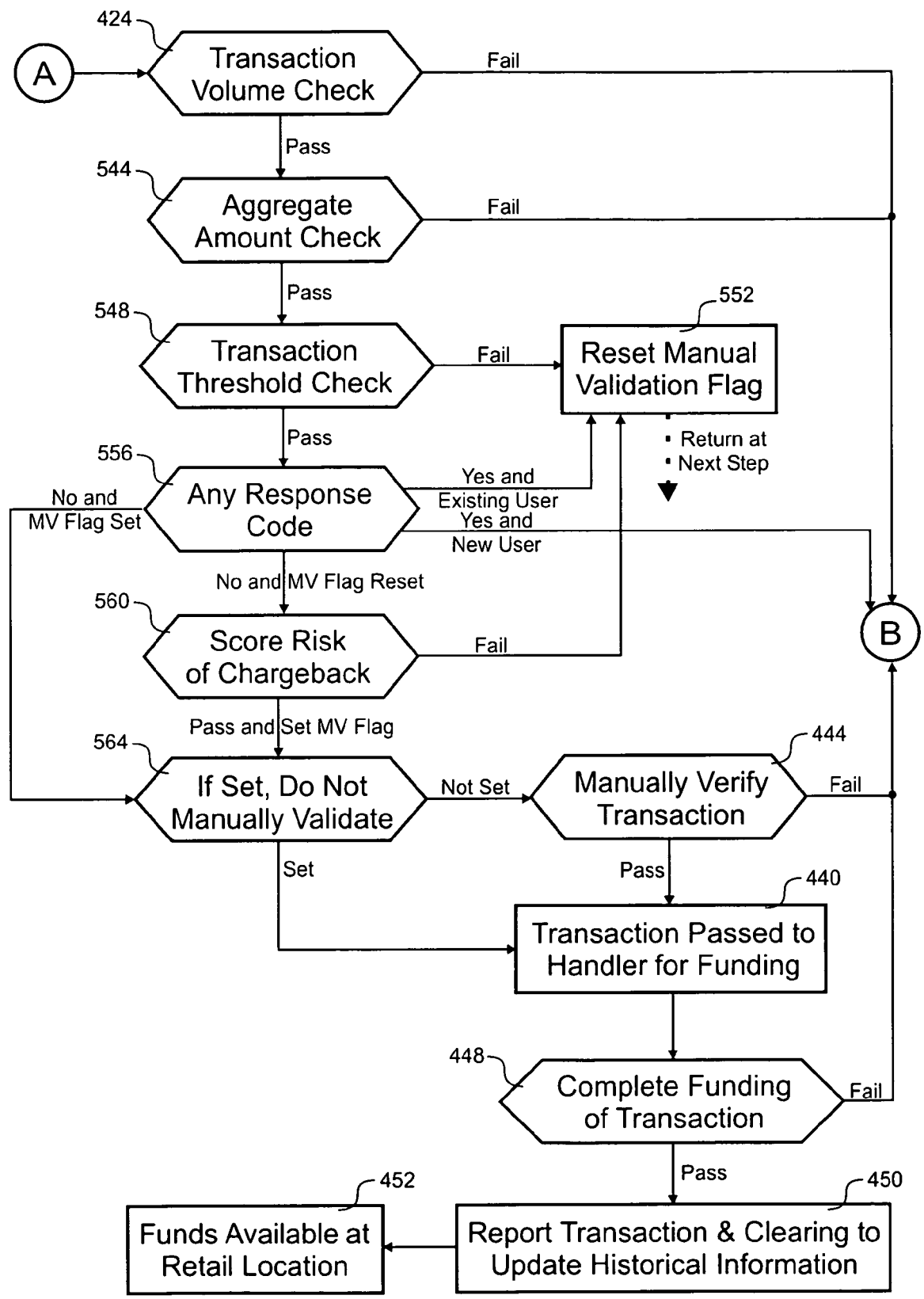

Referring next to FIGS. 5A and 5B, a block diagram of another embodiment of a process 500 for processing a money transfer is shown. This embodiment uses the FRSS 185, but not the authentication service 180, when processing an online money transfer. The depicted portion of the process begins in step 404, where the payor logs into the payment enabler 170-2. This embodiment uses the Internet interface 120-3 to the payment enabler 170-2, but other embodiments could use other interfaces 120. Demographic, payment and transfer information is entered in one or more web pages in step 504. The demographic information describes the payor and payee, the transfer information includes the particulars of the money transfer and the payment information to interface with the handler 160.

Basic checks are performed in step 508 to detect any entry errors for the information. These basic checks include checking that all necessary fields are completed and that the information is in the correct format. These formatting checks include checking that the correct number of digits are entered for the phone number and credit card. Where entry errors are detected in step 512, the process 500 loops back to step 504 for modification.

Internal business rules are checked in step 422. These rules can be activated or deactivated by modifying a file that indicates whether a test should be active or inactive. That file can be modified periodically. Also, new tests can be added to the internal business rules as scripts or software functions. Table IV shows the internal business rules performed in step 422 of this embodiment. Where one of the business rules fails, the payor 110 is declined in step 412 and referred to a retail location 140 in step 416 to fund the transfer. Some embodiments could note the problematic information to give an opportunity for the payor 110 to correct the information before referral to an agent location for funding the transfer.

TABLE IV

| Internal Business Rule | Status |
| --- | --- |
| Check that basic arithmetic functions on the card number can be performed correctly | Active |

TABLE IV-continued

| Internal Business Rule | Status |
|---|---|
| Check first 6 digits of card against list of valid bank identification nos. where foreign issued cards are manually validated | Active |
| Check if card is also associated with another user | Active |
| Check if the payor and payee have the same name and are likely the same person which should be treated as a cash advance unless a debit card is specified | Active |
| Check if the phone number is of an illegal format, for example, uses an illegal area code | Active |
| Check if the sender name does not match a name previously entered for the account | Active |
| Check if the payor already has an account by matching name records, e-mail addresses, customer ID, etc. | Active |

In step 516, the demographic information and payment information is checked against lists of unacceptable users and accounts. In this embodiment, the hot lists of unacceptable users and accounts is generated from previous unsuccessful transactions, chargebacks to the card or other unfavorable history. Table V shows the hot list checks that are performed in this embodiment. These transactions could have been online money transfers or other transactions that have information available. For example, a pay day loan to the payor could have resulted in non-payment of the loan by the payor. Subsequent attempts to perform an online transfer could be prevented if the payor with the bad loan were added to the hot list. Although this embodiment uses an internally maintained hot list, a list from a third party could also be used. Where a transaction can trigger a hit on one of the hot lists, the payor 110 is referred to a retail location 140 to fund the transfer.

TABLE V

| Internal Business Rule | Status |
|---|---|
| Check payee name against internal database | Active |
| Check payor phone number against internal database | Inactive |
| Check account number against internal database | Active |
| Check bank routing number against internal database | Inactive |
| Check payor's account against internal database | Active |

As part of homeland security or other measures, transaction information can be checked against a government-supplied hot list of information in step 520. This could include checking any of information provided by the payor against lists or rules provided by the government. In this embodiment, the Office of Foreign Assets Control provides the government hot list, but any number or combination of government hot lists could be checked. Where information matches the hot list, this information is investigated in step 524. The investigation could be performed by the payment enabler staff and/or government agents. If the match to the government hot list is determined to be a false positive in step 526 after proper investigation, processing continues to step 528.

In step 528, a determination of whether the payor 110 has been previously manually (or electronically via an interactive chat session) validated before is performed. New users and certain existing users may never have been validated before. Where the payor 110 has been manually validated before, processing continues to step 532 where the manual validation (MV) flag is set. When the MV flag is set, manual validation is not required unless the flag is reset later in the process 500. Manual validation could be performed over the phone, via chat or in a transaction referred to a retail location 140. The clerk at the retail location 140 can manually validate the transaction because the payor pays in cash.

Where there is no record of a manual validation in step 528, processing continues to step 536. Historical scores may be available to the payment enabler 170 that indicate the payor 110 has a low risk of fraud. For example, the payor 110 may have an excellent scoring for previous telephone interface initiated money transfers. Where there is a high score, the MV flag is set in step 532. Where there is no pre-existing score or a low score, the MV flag is reset in step 540. Processing continues from either step 532 or 540 to step 424 of FIG. 5B.

In step 424, a transaction volume check is performed. If there are more than three transactions in a moving thirty-day window, the transaction is referred to a retail location 140. Processing continues to step 544 if the transaction volume check passes. In step 544, an aggregate amount check is performed to determine if the payor 110 has sent more than $2,000 in a moving 30-day window, for example. Where this limit is exceeded, processing continues to step 412 where the payor 110 is referred to a retail location 140.

Where the limit is not yet exceeded, processing continues to step 548 where the amount of the transaction is tested against a threshold. In this embodiment, the threshold for each transaction is $1,000 if the MV flag is currently reset, but $3,000 if the MV flag is currently set. Where the threshold for the given situation is crossed, processing continues to step 552 where the MV flag is reset. After resetting the flag or where the appropriate threshold is not crossed, processing continues to step 556. In some embodiments, the flag is only set if specific personal information is validated, i.e. address, telephone, names, etc.

In steps 556 and 560, the FRSS 185 is relied upon to return any response codes and a scoring of the transaction. In step 556, the action taken where a response code is received depends upon whether the payor 110 is a new user or an existing user. In this situation, new users are those without any prior transactions, manual validation or historical scoring information, and existing users are those with prior transactions, prior manual validation or scoring. The historical or prior scoring could be from use of a related product, for example, telephone originating money transfers. Where there is a response code and it is an existing user, the MV flag (flags not reset) is reset in step 552 before proceeding to step 560. A new user with a negative response code proceeds to step 412 where the transaction is referred to a retail location 140.

There are two possible ways to process a transaction that does not receive a response code in step 556. In the first way, there is no response code and the MV flag is set. In this case, processing skips over step 560 by proceeding from step 556 to step 564. Where there is no response code and the MV flag is reset or where there is a response code for an existing user, the second way involves scoring the risk of chargeback with the FRRS 185 in step 560. If the score is below a threshold in step 560, the MV flag is reset 552 before proceeding to step 564. Where the score is equal to or above a threshold in step 560, the MV flag is reset 552 before proceeding to step 564.

In step 564, a determination is made as to whether MV flag is set. MV is not performed where the MV flag is set, but is performed in step 444 where the MV flag is reset. As is well known in the art, the MV flag may use positive or negative logic to accomplish the same result. Failure of the MV will result in referring the payor 10 to the retail location 140. If MV is performed successfully or is not performed, processing continues to step 440 to fund the transfer from the money handler 160. If the funding fails in step 448, the payor 10 is referred to a retail location 140. Alternatively, the transaction is reported in step 450 and funds are made available to the payee 130 in step 452 if the transaction funds in step 448.

Figure 6A:
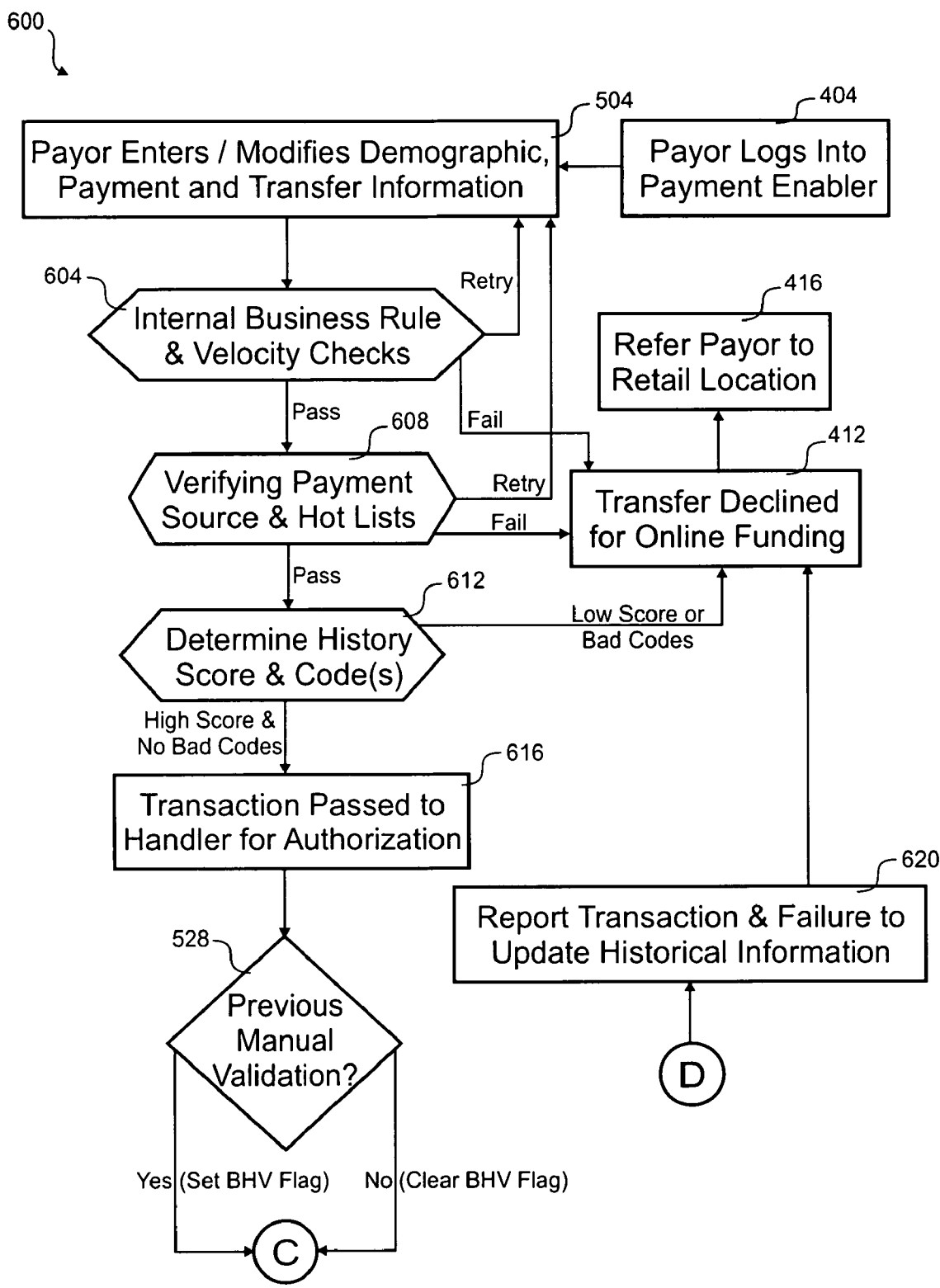
FIGS. 6A and 6B are block diagrams of yet another embodiment of a process for performing a money transfer.
Figure 6B:
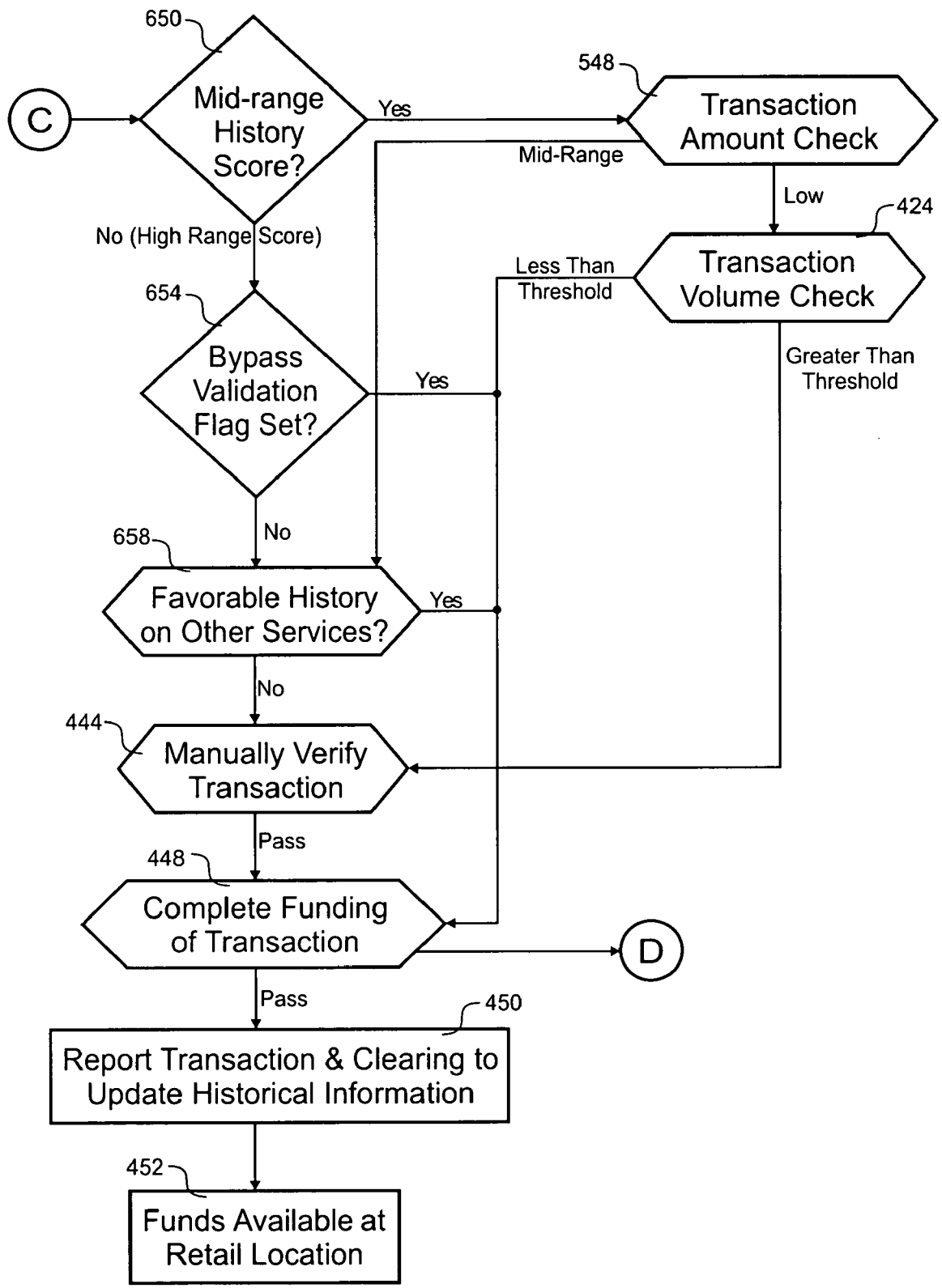

Referring next to FIGS. 6A and 6B, block diagrams of yet another embodiment of a process 600 for performing a money transfer is shown. The depicted portion of the process begins in step 404 where the payor 110 logs into the payment enabler 170. Demographic, payment and transfer information is entered or modified in various web pages in step 504. The internal business rules are checked along with velocity checks in step 604. The velocity checks could include a limit on the amount of a single transaction, a limit on the aggregate amount for various transactions over a time period, a limit on the number of transactions during a time period, etc. In step 608, the payment source is verified and the payor information is checked against government and internal hot lists of persons who should not be allowed to complete a transfer using the system 100. Where typographical or minor mistakes are made in entering demographic, payment and transfer information, steps 604 and 608 may require looping back to step 504 to correct those problems. Issues that are not resolved in this manner result in the payor being routed to a retail location 140 to initiate the transfer in steps 412 and 416.

Should the payor pass steps 604 and 608, step 612 scores the risk that the transaction will fund successfully and provides error codes. In this embodiment, codes 225 and 230 or a score less than 336 result in the transaction being declined for online funding, but can be funded at a retail location 140. A transaction code and retail location addresses could be provided to the payor 110 to ease the redirection to the retail location 140. The transaction code allows the agent at the retail location 140 to access the entered transaction information. The error codes and rejection threshold tested in step 612 are table driven and can be updated to adjust the risk concerns as they are refined. The scoring and codes generated in step 612 use a large database of transactions performed outside the system 100 as well as all those performed by the system 100. In this way, the risk considerations can have the benefit of a broad set of regression datapoints.

Where the checks in step 612 do not result in a high score or any bad error codes, processing continues to step 616 where the handler 160 authorizes the transaction. A test is performed in step 528 in order to set a bypass human validation (BHV) flag where prior human validation has occurred. After step 528, processing continues to FIG. 6B where mid-range scores are divided from high-range scores. In this embodiment, a mid-range score is from 336-500 and a high score is 500-999, but these values are also table driven and can be updated at any time.

For mid-range error codes, processing continues from step 650 to step 548 where the amount of money being transferred is analyzed., For low transaction amounts, processing continues to step 424 where the number of transactions during a time period is determined. In one embodiment, these thresholds are table driven and set to $1,000 or less for a low amount and three transactions in a thirty day period. Where the threshold number of transactions is not exceeded and the amount is below the lower threshold, processing goes to step 448 and avoids manual validation of the transaction in step 444. Where the transaction is in a middle range of $1,000-$3,000 in one embodiment, processing continues step 658 from step 548. Some embodiments may have additional checks that vary by state with transactions in the middle range. Where the transaction volume exceeds the threshold in step 424, processing goes to step 444 for manual validation.

In step 650, some payors 110 will have a high score and processing will continue to step 654. Where the BHV flag is set, processing continues from step 654 to step 448 to bypass human validation. If the flag is not set, a check is performed in step 658 determine if there is a favorable history of transactions with other services associated with the system 100. For example, the system 100 may have access to other affiliated transfer services, where history on the payor 110 and/or their payment instrument is known. Where a favorable history is determined, processing skip step 444 and goes strait from step 658 to step 448. For those payors 110 without favorable histories, manual validation is performed in step 444. Funding of the transaction is completed in step 448. Where the funding is rejected, processing loops back to step 620 of FIG. 6A where the result is added to the historical databases referenced in steps 612 and 658. Once recorded, the payor 110 can do the transfer at a retail location 140 in steps 412 and 416. Where the funding is successful in step 448, processing goes to step 450 where that success is recorded in the databases used in steps 612 and 658. Finally, the money is available 452 at the retail location 140 for the payee 130.

Figure 7:
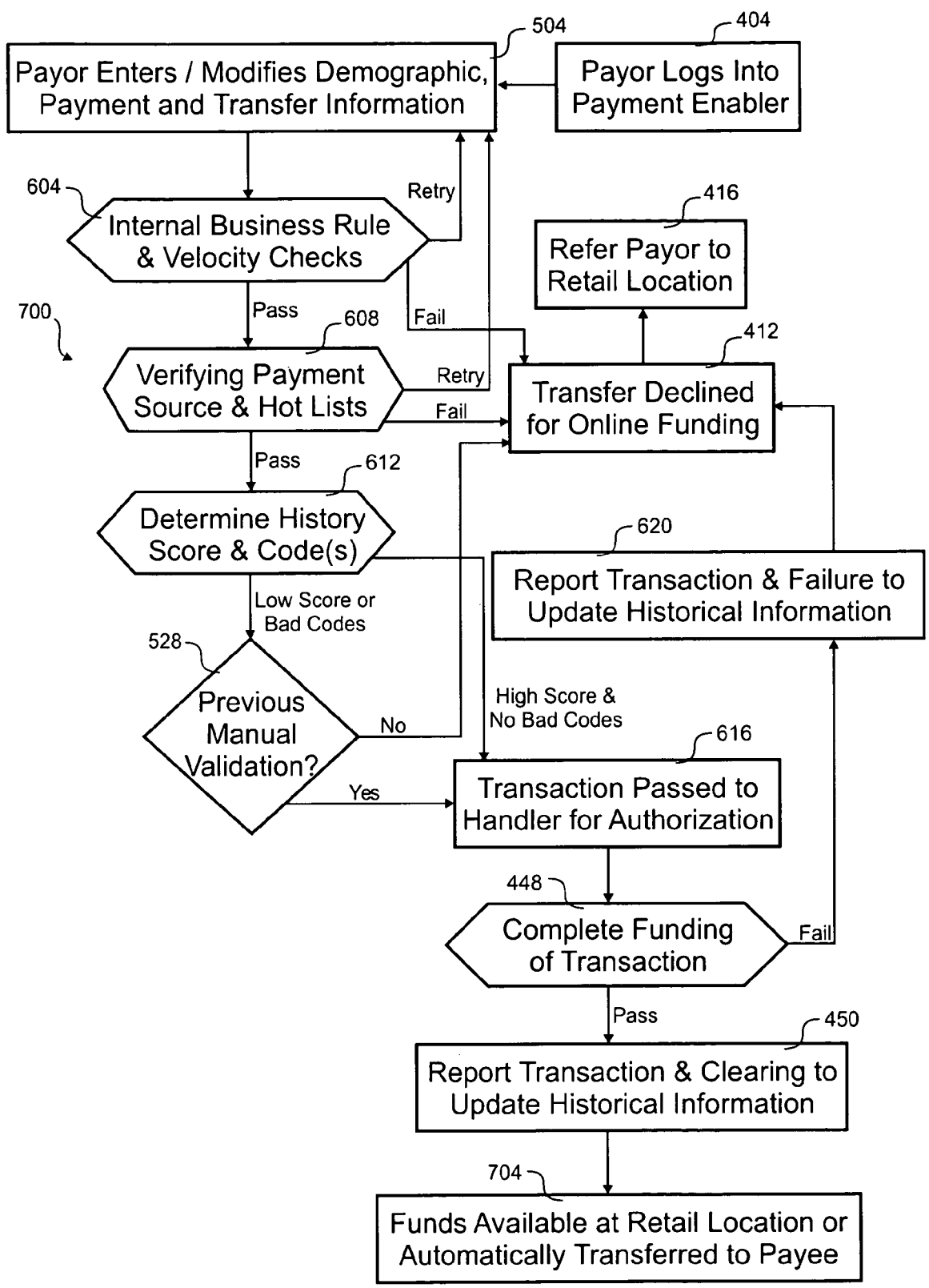
FIG. 7 is a block diagram of still another embodiment of a process for performing a money transfer.

With reference to FIG. 7, a block diagram of still another embodiment of a process 700 for performing a money transfer is shown. This embodiment allows online or telephone initiated transfers without visiting a retail location 140 in some instances. The depicted portion of the process 700 begins in step 404 where the payor logs into the system 100. In step 504, the web pages are completed. Checks are performed in steps 604 and 608 that might result in correction or referral to an agent location.

Scores and codes are determined in step 612. Where there are low scores or troubling codes, a check for prior manual validation is performed in step 528. For instances where manual validation was previously performed, processing continues to step 616 for authorization, step 448 for funding, and step 450 for recording the outcome. If all is successful, the funds are transferred to the payee 130 in step 704 or made available at a retail location. Should the funding of the transaction fail in step 448, the failure is reported in step 620 before referral to a retail location 140 in steps 412 and 416. Where there are no troubling codes and a high score in step, processing continues to step 616 and avoids a check for prior manual validation. Although this embodiment is initiated online, other embodiments could be initiated in any manner where the user is not physically present, such as a telephone initiation.

A number of variations and modifications of the invention can also be used. For example, the above embodiments have a number of steps that are preformed to reduce the risk of fraud. Other embodiments could use any subset of these steps to achieve a balance between efficiency and fraud. Further, some embodiments may use multiple FRSS or multiple authentication services to further reduce fraud. While in the above embodiment the payee picks up the money at a retail location, other embodiments could use the system to pay any payee in an online transaction where the money is electronically available to the payee.

While the principles of the invention have been described above in connection with specific apparatuses and methods, it is to be clearly understood that this description is made only by way of example and not as limitation on the scope of the invention.

What is claimed is:

1. A non-transitory computer readable storage medium comprising computer readable instructions for processing a transaction where the transaction is initiated by a payor online but paid to a payee in-person, said computer readable instructions comprising instructions that when executed by a processor of a computer cause the processor to perform the method of:

accepting, by a computer system, payor information at a location, wherein the payor is located across a wide area network from the location;

accepting, by the computer system, transaction information at the location, wherein the transaction information includes an amount and a payee identifier;

accepting, by the computer system, payment source information at the location, wherein the payment source information includes account details associated with an account of the payor at a money handler;

evaluating, by the computer system, a risk score related to a likelihood that the transaction will complete successfully;

referring, by the computer system, funding to be completed by the payor at a retail location linked with a payment enabler, if the risk score is below a first risk score threshold, wherein the payor is required to physically attend the retail location;

referring, by the computer system, funding to be completed by the payor via telephonic interaction with the payment enabler if the risk score is between the first risk score threshold and a second risk score threshold, wherein: the payor is presented, via the wide area network, with a telephone number of the payment enabler;

permitting, by the computer system, online funding of the transaction if the risk score is above the second risk score threshold;

billing, by the computer system, the money handler for at least the amount;

determining, by the computer system, if the money handler settles the amount; and storing, by the computer system, historical information on the transaction.

2. The computer readable medium for processing the transaction where the transaction is initiated by the payor online, but paid to the payee in-person as recited in claim 1, further comprising instructions for a step of checking the transaction information against a usage limit.

3. The computer readable medium for processing the transaction where the transaction is initiated by the payor online, but paid to the payee in-person as recited in claim 1, further comprising instructions for a step of verifying at least some of the payment source information.

4. The computer readable medium for processing the transaction where the transaction is initiated by the payor online, but paid to the payee in-person as recited in claim 1, wherein the three accepting steps are performed with a web site associated with the location.

5. The computer readable medium for processing the transaction where the transaction is initiated by the payor online, but paid to the payee in-person as recited in claim 1, wherein the historical information comprises at least two of the risk, a settlement result, the payor information, the transaction information, and the source information.

6. The computer readable medium for processing the transaction where the transaction is initiated by the payor online, but paid to the payee in-person as recited in claim 1, wherein the evaluating step further comprises steps of:
  evaluating a first risk that the amount will be successfully settled; and
  evaluating a second risk that the payment source information is not associated with the payor.

7. The computer readable medium for processing the transaction where the transaction is initiated by the payor online, but paid to the payee in-person as recited in claim 1, wherein the evaluating step comprises a step of evaluating the risk of the amount being successfully settled from historical information gathered from past transactions.

8. The computer readable medium of claim 7, wherein the historical information comprises a history score and wherein the transaction is declined in response to the history score is less than a rejection threshold.

9. The computer readable medium of claim 7, wherein the historical information comprises an indication of whether a past manual validation of the payment source information was performed and manually validating is not performed if the history score exceeds a threshold amount and a past manual validation is indicated.

10. The computer readable medium of claim 7, wherein the historical information comprises a history score and information gathered from past transactions with other affiliated transfer services and wherein manually validating is not performed if the history score exceeds a threshold amount and the information gathered from past transactions with other affiliated transfer services is favorable.

11. The computer readable medium for processing the transaction where the transaction is initiated by the payor online, but paid to the payee in-person as recited in claim 1, wherein the first-listed checking step comprises one or more of the following steps:
  checking if the payor has exceeded a predetermined number of transactions during a first predetermined time period;
  checking if the amount exceeds a threshold amount; and
  checking if the payor has exceeded an aggregate amount during a second predetermined time period, wherein the first and second predetermined time periods may be the same or different.

12. The computer readable medium for processing the transaction where the transaction is initiated by the payor online, but paid to the payee in-person as recited in claim 1, wherein the billing step comprises billing the money handler for a sum of the amount and a transaction fee.

13. The computer readable medium for processing the transaction where the transaction is initiated by the payor online, but paid to the payee in-person as recited in claim 1, further comprising instructions for a step of reporting the historical information away from the location.

14. The computer readable medium for processing the transaction where the transaction is initiated by the payor online, but paid to the payee in-person as recited in claim 1, wherein the payee identifier is chosen from the group consisting off a name, an e-mail address, a test phrase, an account number, and an identification number.

15. The computer readable medium for processing the transaction where the transaction is initiated by the payor online, but paid to the payee in-person as recited in claim 1, wherein the payment source information comprises two or more of the following: an account number, a bank routing number, an account holder name, a card issuer phone number, an account billing address, and a CVV2 code.

16. The computer readable medium for processing the transaction where the transaction is initiated by the payor online, but paid to the payee in-person as recited in claim 1, wherein the money handler is chosen from a group consisting of: a debit card organization, a credit card organization, a bank, and a retail location.

17. A non-transitory computer readable storage medium comprising computer readable instructions for processing a transaction where the transaction is initiated by a payor online but paid to a payee in-person, said computer readable instructions comprising instructions that when executed by a processor of a computer cause the processor to perform the method of:

accepting, by a computer system, payor information at a location, wherein the payor is located across a wide area network from the location;

accepting, by the computer system, transaction information at the location, wherein the transaction information includes an amount and a payee identifier;

accepting, by the computer system, payment source information at the location, wherein the payment source information includes account details associated with an account of the payor at a money handler;

verifying, by the computer system, at least some of the payment source information;

evaluating, by the computer system, a risk score related to a likelihood that the transaction will complete successfully, referring, by the computer system, funding to be completed by the payor at a retail location linked with a payment enabler, if the risk score is below a first risk score threshold, wherein, wherein the payor is required to physically attend the retail location;

referring, by the computer system, funding to be completed by the payor via telephonic interaction with the payment enabler if the risk score is between the first risk score threshold and a second risk score threshold, wherein: the payor is presented, via the wide area network, with a telephone number of the payment enabler;

permitting, by the computer system, remote funding of the transaction if the risk score is above the second risk score threshold; and billing, by the computer system, the money handler for at least the amount.

18. The computer readable medium for processing the transaction where the transaction is initiated remotely, but paid to the payee in-person as recited in claim 17, further comprising instructions for a step of determining if the money handler settles the amount.

19. The computer readable medium for processing the transaction where the transaction is initiated remotely, but paid to the payee in-person as recited in claim 17, wherein the evaluating step comprises steps of:

evaluating the risk based upon first information; and
evaluating the risk based upon second information at least partially different from the first information.

20. The computer readable medium for processing the transaction where the transaction is initiated remotely, but paid to the payee in-person as recited in claim 17, further comprising instructions for a step of storing historical information on the transaction.

21. The computer readable medium for processing the transaction where the transaction is initiated remotely, but paid to the payee in-person as recited in claim 17, further comprising instructions for a step of checking the transaction information against a usage limit.

22. The computer readable medium for processing the transaction where the transaction is initiated by the payor online, but paid to the payee in-person as recited in claim 21, wherein the first-listed checking step comprises one or more of the following steps:

checking if the payor has exceeded a predetermined number of transactions during a first predetermined time period;

checking if the amount exceeds a threshold amount; and checking if the payor has exceeded an aggregate amount during a second predetermined time period, wherein the first and second predetermined time periods may be the same or different.

23. The computer readable medium for processing the transaction where the transaction is initiated by the payor online, but paid to the payee in-person as recited in claim 17 wherein the evaluating step further comprises steps of:

evaluating a first risk that the amount will be successfully settled; and evaluating a second risk that the payment source information is not associated with the payor.

24. The computer readable medium for processing the transaction where the transaction is initiated remotely, but paid to the payee in-person as recited in claim 17, wherein the first-listed evaluating step comprises a step of evaluating the risk of the amount being successfully settled from historical information gathered from past transactions.

25. A non-transitory computer readable storage medium comprising computer readable instructions for processing a transaction that transfers money or its equivalents from a payor to a payee, said computer readable instructions comprising instructions that when executed by a processor of a computer cause the processor to perform the method of:

accepting, by a computer system, payor information from the payor, wherein the payor is located across a wide area network;

accepting, by the computer system, transaction information, wherein the transaction information includes an amount and a payee identifier; and accepting, by the computer system, payment source information, wherein the payment source information includes account details associated with an account of the payor at a money handler;

verifying, by the computer system, at least some of the payment source information;

evaluating, by tile computer system, a risk score related to a likelihood that the transaction will complete successfully;

checking, by the computer system, a transaction velocity linked with the payor against a first velocity threshold and a second velocity threshold, wherein the first velocity threshold is less than the second velocity threshold;

referring, by the computer system, funding to be completed by the payor at a retail location linked with a payment enabler, if:

the risk score is below a first risk score threshold; the transaction velocity is above the second velocity threshold; or both, wherein: the payor is required to physically attend the retail location;

referring, by the computer system, funding to be completed by the payor via telephonic interaction with the payment enabler if:

the risk score is between the first risk score threshold and a second risk score threshold;

the transaction velocity is between the first velocity threshold and the second velocity threshold; or both, wherein: the payor is presented, via the wide area network, with a telephone number to contact the representative;

permitting, by the computer system, online funding of the transaction if the risk score is above the second risk score threshold and the transaction velocity is below the first velocity threshold;

billing, by the computer system, the money handler for at least the amount; and transferring, by the computer system, the money to the payee.

26. The computer readable medium for processing the transaction that transfers money or its equivalents from the payor to the payee as recited in claim 25, further comprising instructions for a step of determining if the money handler settles the amount.

27. The computer readable medium for processing the transaction that transfers money or its equivalents from the payor to the payee as recited in claim 25, further comprising instructions for a step of storing historical information on the transaction.

28. The computer readable medium for processing the transaction that transfers money or its equivalents from the payor to the payee as recited in claim 25, wherein the first-listed evaluating step further comprises steps of:
   evaluating a first risk that the amount will be successfully settled based upon the first information; and
   evaluating a second risk that the payment source information is not associated with the payor based upon the second information.

29. The computer readable medium for processing the transaction that transfers money or its equivalents from the payor to the payee as recited in claim 28, wherein the first-listed evaluating step comprises a step of evaluating the risk of the amount being successfully settled from historical information gathered from past transactions.

30. The computer readable medium for processing the transaction that transfers money or its equivalents from the payor to the payee as recited in claim 25, wherein the checking step comprises one or more of the following steps:
   checking if the payor has exceeded a predetermined number of transactions during a first predetermined time period;
   checking if the amount exceeds a threshold amount; and
   checking if the payor has exceeded an aggregate amount during a second predetermined time period, wherein the first and second predetermined time periods may be the same or different.

* * * * *

UNITED STATES PATENT AND TRADEMARK OFFICE
CERTIFICATE OF CORRECTION

| | | |
|---|---|---|
| PATENT NO. | : 8,082,210 B2 | |
| APPLICATION NO. | : 10/832809 | |
| DATED | : December 20, 2011 | |
| INVENTOR(S) | : Scott Hansen et al. | |

It is certified that error appears in the above-identified patent and that said Letters Patent is hereby corrected as shown below:

Column 3, Line 17, please delete "10" and replace with -- 110 --.

Column 3, Line 36, please delete "10" and replace with -- 110 --.

Column 14, Line 61, please delete "10" and replace with -- 110 --.

Column 14, Line 64, please delete "10" and replace with -- 110 --.

Column 18, Line 49, please delete "off" and replace with -- of: --.

Column 20, Line 38, please delete "tile" and replace with -- the --.

Signed and Sealed this
Twentieth Day of March, 2012

David J. Kappos
*Director of the United States Patent and Trademark Office*